US007459624B2

(12) United States Patent

Schmidt et al.

(10) Patent No.: US 7,459,624 B2

(45) Date of Patent: Dec. 2, 2008

(54) GAME CONTROLLER SIMULATING A MUSICAL INSTRUMENT

(75) Inventors: Daniel A. Schmidt, Somerville, MA (US); Gregory B. LoPiccolo, Brookline, MA (US); Eran Egozy, Brookline, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 0 days.

(21) Appl. No.: 11/683,136

(22) Filed: Mar. 7, 2007

(65) Prior Publication Data

US 2007/0234885 A1 Oct. 11, 2007

Related U.S. Application Data

(60) Provisional application No. 60/743,938, filed on Mar. 29, 2006.

(51) Int. Cl.

*G09B 15/00* (2006.01)
*G09B 15/02* (2006.01)
*G10H 1/00* (2006.01)

(52) U.S. Cl. ...................... 84/477 R; 84/483.2; 84/609; 84/615

(58) Field of Classification Search ....................... None
See application file for complete search history.

(56) References Cited

U.S. PATENT DOCUMENTS

| | | | | |
|---|---|---|---|---|
| 4,794,838 | A * | 1/1989 | Corrigau, III | 84/600 |
| 5,777,251 | A * | 7/1998 | Hotta et al. | 84/609 |
| 6,162,981 | A * | 12/2000 | Newcomer et al. | 84/485 R |
| 7,223,913 | B2 * | 5/2007 | Knapp et al. | 84/722 |
| 7,320,643 | B1 * | 1/2008 | Brosius et al. | 463/37 |
| 2006/0191401 | A1 * | 8/2006 | Ueshima et al. | 84/724 |

* cited by examiner

*Primary Examiner*—Marlon T Fletcher
(74) *Attorney, Agent, or Firm*—Proskauer Rose LLP

(57) ABSTRACT

A simulated musical instrument may be used to alter the audio of a video game, the video aspects of video game, or both. Use of a controller simulating a musical instrument allows a rhythm-action game can be enjoyed in a manner closer to a realistic state of playing an instrument.

27 Claims, 9 Drawing Sheets

510

GAME CONTROLLER SIMULATING A MUSICAL INSTRUMENT

RELATED APPLICATIONS

This application claims priority to U.S. provisional application Ser. No. 60/743,938 filed on Mar. 29, 2006 and titled GAME CONTROLLER SIMULATING A GUITAR.

FIELD OF THE INVENTION

This invention relates to video game controllers and, more particularly, to video game controllers that emulate a musical instrument to provide game input.

BACKGROUND OF THE INVENTION

"Rhythm-action" is a popular video game genre which requires a player to perform phrases from a pre-recorded musical composition using the video game's input device. One of the best-known examples of this genre is the BEATMANIA series of games published by Konami Co. Ltd. of Japan. In this series of games the notes in musical phrases are graphically displayed to the player as a series of visual markers spaced along one or more timeliness each marker corresponds to one note in the phrase. In the block diagram environment shown in FIG. 1, visual markers 104 move from the top of the display to the bottom of the display. As each marker on the scrolling timelines 110, 120, 130, 140 passes a graphical cursor 108 displayed along this timeline, the player must simultaneously press a button on an input device (not shown) corresponding to the correct timeline to play the sound of the corresponding note at the correct time. If the player performs this action successfully for a sufficient percentage of the notes, he scores well and wins the game. If the player fails to perform this action successfully for a sufficient percentage of the notes, he scores poorly and loses the game. As shown in FIG. 1, two or more players may compete against each other, typically by each one attempting to play back different, parallel musical phrases from the same song simultaneously. The player who plays the highest percentage of notes correctly achieves the highest score and wins.

It is known, in the context of some rhythm-action games, to provide game controllers simulating musical instruments that allow players to fully use both their right and left hand to provide game input. It would be desirable to provide a game controller that closely mimics the instrument which the controller simulates in such a way that the physical instrument features mimicked by the controller affect gameplay.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
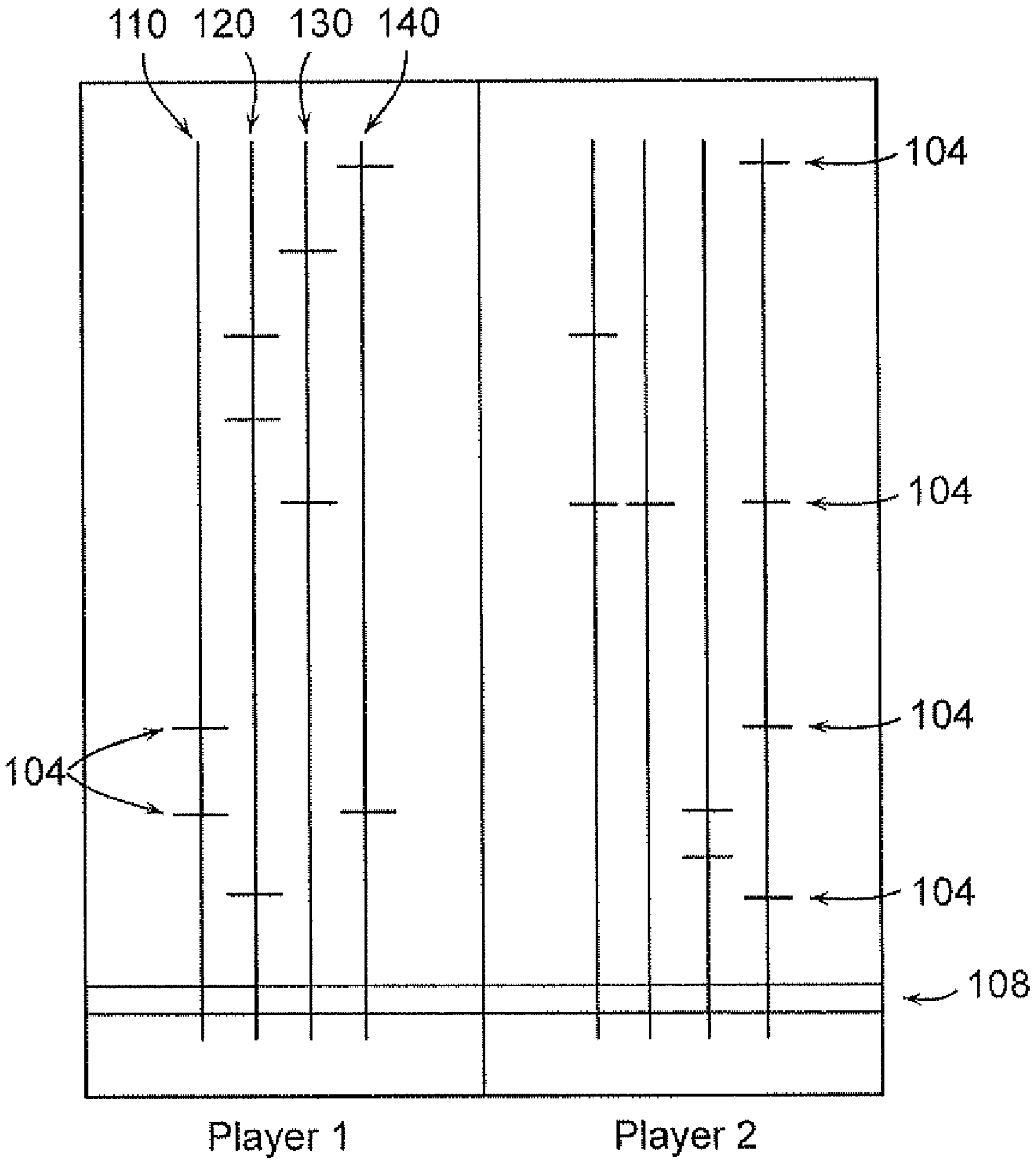
(PRIOR ART) FIG. 1
FIG. 1 is a block diagram depiction of one embodiment of a rhythm-action game environment.

A controller simulating a musical instrument may be used with a variety of gaming platforms, such as: PLAYSTATION2, PLAYSTATION3, or PLAYSTATION PERSONAL, manufactured by Sony Corporation; DREAMCAST, manufactured by Sega Corp.; GAMECUBE, GAMEBOY, GAMEBOY ADVANCE, or WII, manufactured by Nintendo Corp.; or XBOX or XBOX360, manufactured by Microsoft Corp. In other embodiments, the simulated guitar musical controller may be used with a gaming platform comprising a personal computer, personal digital assistant, or cellular telephone.

Although described below in connection with a simulated guitar controller, the game controller may simulate any of a wide variety of musical instruments such as percussion instruments (including cymbals, bell lyre, celeste, chimes, crotales, glockenspiel, marimba, orchestra bells, steel drums, timpani, vibraphone, xylophone, bass drum, crash cymbal, gong, suspended cymbal, tam-tam, tenor drum, tom-tom, acme siren, bird whistle, boat whistle, finger cymbals, flex-a-tone, mouth organ, marching machine, police whistle, ratchet, rattle, sandpaper blocks, slapstick, sleigh bells, tambourine, temple blocks, thunder machine, train whistle, triangle, vibra-slap, wind machine, wood block, agogo bells, bongo drum, cabaca, castanets, claves, conga, cowbell, maracas, scraper, timbales, kick drum, hi-hat, ride cymbal, sizzle cymbal, snare drum, and splash cymbal), wind instruments (including piccolo, alto flute, bass flute, contra-alto flute, contrabass flute, subcontrabass flute, double contrabass flute, piccolo clarinet, sopranino clarinet, soprano clarinet, basset horn, alto clarinet, bass clarinet, contra-alto clarinet, contrabass clarinet, octocontra-alto clarinet, octocontrabass clarinet, saxonette, soprillo, sopranino saxophone, soprano saxophone, conn-o-sax, clar-o-sax, saxie, mezzo-soprano saxophone, alto saxophone, tenor saxophone, baritone saxophone, bass saxophone, contrabass saxophone, subcontrabass saxophone, tubax, aulochrome, tarogato, folgerphone, contrabassoon, tenoroon, piccolo oboe, oboe d'amore, English horn, French horn, oboe de caccia, bass oboe, baritone oboe, contrabass oboe, bagpipes, bugle, cornet, didgeridoo, euphonium, flugelhorn, shofar, sousaphone trombone, trumpet, tuba, accordion, concertina, harmonica, harmonium, pipe organ, voice, bullroarer, lasso d'amore, whip and siren), other stringed instruments (including harps, dulcimer, archlute, arpeggione, banjo, cello, Chapman stick, cittern, clavichord, double bass, fiddle, slide guitar, steel guitar, harpsichord hurdy gurdy, kora, koto, lute, lyre, mandola, mandolin, sitar, ukulele, viola, violin, and zither) and keyboard instruments (including accordion, bandoneon, calliope, carillon, celesta, clavichord, glasschord, harpsichord, electronic organ, Hammond organ, pipe organ, MIDI keyboard, baby grand piano, electric piano, grand piano, janko piano, toy piano, upright piano, viola organista, and spinets).

Game controllers simulating any of the instruments above may provide a note-producing mechanism different from that usually associated with the simulated instrument. For example, a simulated keyboard controller may include, in addition to key as one would expect on a keyboard, a pitch bend wheel or an associated effects pedal as a secondary note-producing mechanism. Simulated woodwind instruments may include "mutes," such as cup mutes, straight mutes, wah-wah mutes, plunger mutes, bucket mutes, or hat mutes. A simulated microphone may include an effects pedal as a secondary note producing mechanism.

Figure 2:
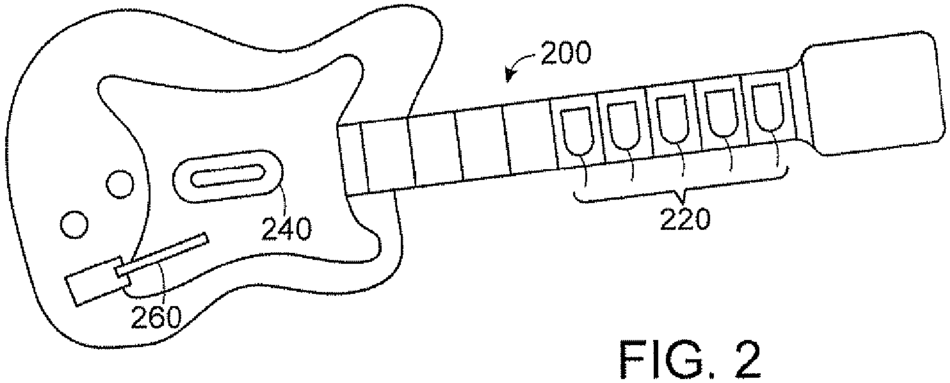
FIG. 2 is a configuration diagram of one embodiment of a guitar controller.

Referring now to FIG. 2, an embodiment of a simulated guitar controller 200 for use with a video game is shown. The simulated guitar controller 200 is provided with fret buttons 220. Although five fret buttons are shown in FIG. 2, any number of fret buttons 220 may be provided by the controller 200. The simulated guitar controller also includes a "strum bar" 240. In order to successfully "play" a game event, the player holds down one or more of the fret buttons 220 while simultaneously strumming the strum bar 240, in much the same way that one would play a guitar. In some embodiments players may also execute "hammer-ons" and "pull-offs," as described below, which allow a player to "play" a game event by pressing or releasing only a fret button 220.

Figure 2A:
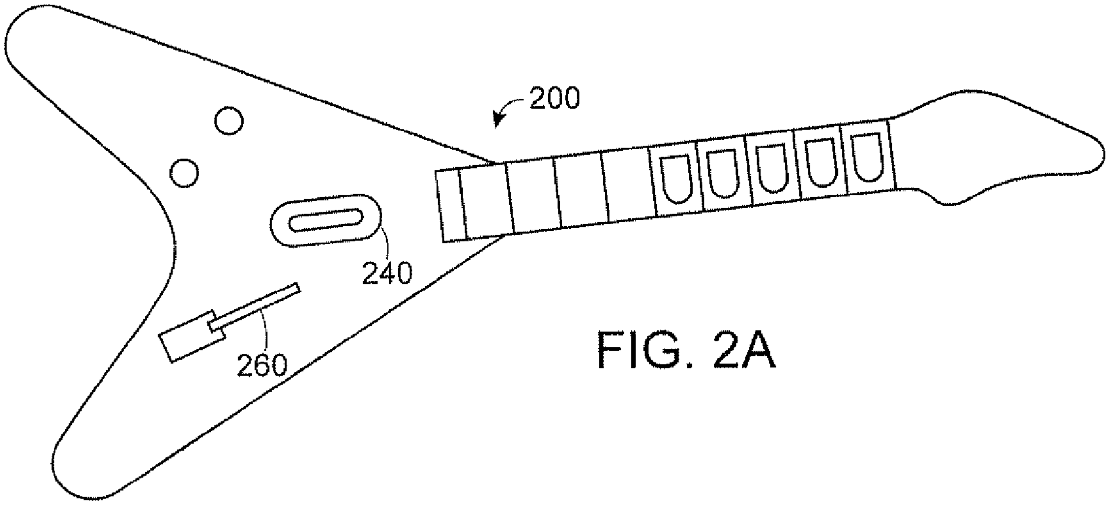
FIG. 2A is a configuration diagram of another embodiment of a guitar controller.
Figure 2B:
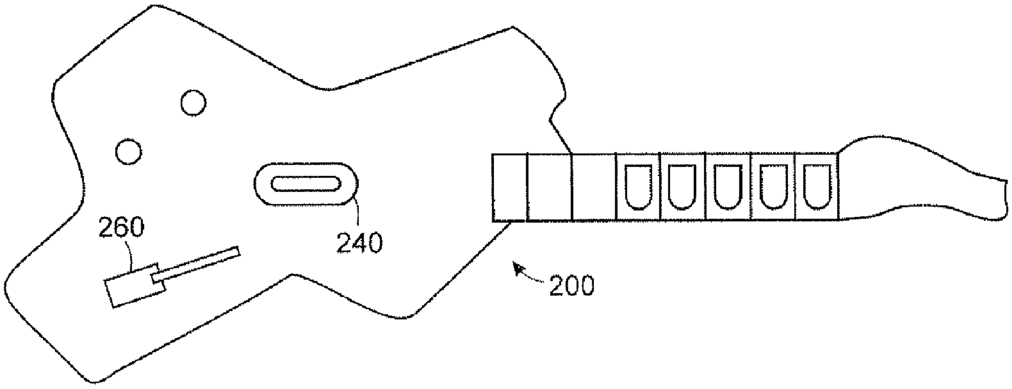
FIG. 2B is a configuration diagram of another embodiment of a guitar controller.

FIGS. 2A and 2B depict alternate embodiments of the guitar controller of FIG. 2. FIG. 2A depicts an embodiment of the guitar controller intended to simulate a guitar model by Gibson known as the "Flying V." FIG. 2B depicts an embodiment of the guitar controller intended to simulate a guitar model known as the "Moderne." Any other body styling may be provided. For example, in some embodiments, the body portion of the guitar controller simulates a Gibson Blueshawk, Gibson Byrdland, Gibson Chet Atkins SST, Gibson Citation, Gibson Corvus, Gibson Digital, Gibson ES-120, Gibson ES-125, Gibson ES-135, Gibson ES-137, Gibson ES-150, Gibson ES-165, Gibson ES-175, Gibson ES-225, Gibson ES-295, Gibson ES-330, Gibson ES-335, Gibson ES-335 "Lucille", Gibson ES-345, Gibson ES-347, Gibson ES-355, Gibson EDS-1275, Gibson Explorer (also known as the X-plorer), Gibson Firebird, Gibson Futura, Gibson Howard Roberts Fusion, Gibson Invader, Gibson L4-CES, Gibson L5, Gibson L5S, Gibson L6-S, Gibson Les Paul, Gibson Les Paul Black Beauty, Gibson Les Paul Custom Anniversary 25/50, Gibson Les Paul Recording, Gibson Les Paul 23, Gibson Les Paul 432, Gibson (Les Paul) "The Paul" Deluxe (which has a cutaway SG body), Gibson (Les Paul) "The Paul" Deluxe Firebrand (which is characterized in having a cutaway SG body with firebranded Gibson logo), Gibson Marauder, Gibson Melody Maker, Gibson Nighthawk, Gibson RD, Gibson S-1, Gibson SG, Gibson SG Special, Gibson SG Supreme, Gibson Sonex, Gibson Super 400, Gibson MIII, Gibson Advanced Jumbo, Gibson Blues King, Gibson B12-45 12 string, Gibson C-165 Maple, Gibson C-165 Rosewood, Gibson Hummingbird, Gibson Hummingbird Custom, Gibson Dove, Gibson Dove Artist Model, Gibson Doves in Flight Custom, Gibson J-160 E VS Std, Gibson J-180, Gibson J-185, Gibson J-185 EC, Gibson J-185 EC Rosewood, Gibson J-185 EC Cutaway, Gibson J-90 Super Fusion, Gibson J-45, Gibson J-45 Deluxe Gibson J-45 Rosewood, Gibson J-45 Custom Vine, Gibson J-50, Gibson L-00, Gibson L-130, Gibson L-140, Gibson L-150 Custom, Gibson LC-1 Cascade, Gibson LC-2 Sonoma, Gibson J-100, Gibson Nick Lucas Reissue, Gibson Nick Lucas Elite, Gibson J-150 Maple, Gibson J-200, Gibson J-200 EC, Gibson SJ-200 Western Classic, Gibson J-200 Custom Vine, Gibson J-250 Monarch, Gibson J-2000, Gibson Super 200 Cutaway Custom, Gibson SJ-300 Rosewood, Gibson Sheryl Crow Signature Model, Gibson Songwriter Deluxe, Gibson Songwriter Deluxe Cutaway, Gibson Songwriter Deluxe 12 String, Gibson Southern Jumbo, Gibson Traveling Songwriter, Fender Broadcaster, Fender Bullet, Fender Cyclone, Fender Duo-Sonic, Fender Electric XII, Fender Jaguar, Fender Jag-stang, Fender Jazzmaster, Fender Katana, Fender Contemporary Stratocaster Japan, Fender Lead Series, Fender LTD, Fender Musicmaster, Fender Mustang, Fender Prodigy, Fender Performer, Fender Showmaster, Fender Starcaster, Fender Stratocaster, Stratocaster XII, Fat Strat, Fender Telecaster, Fender Telecaster Custom, Fender Telecaster Deluxe, J5 Telecaster, Fender Telecaster Squire, Fender Toronado, Fender Swinger, Fender Bronco, or Fender Custom.

The body portion of the guitar may stimulate bass guitars, such as the Gibson EB-0, Gibson EB-1, Gibson EB-2, Gibson EB-3, Gibson EB-6, Gibson RD bass, Gibson Thunderbird, Gibson Ripper, Gibson Grabber, Gibson G3, Gibson Victory Standard bass, Gibson Les Paul bass, Fender Jazz Bass, Fender Jaguar Bass, Fender Mustang Bass, Fender Precision Bass, Fender Performer Bass, Fender Telecaster Bass, Fender VI, Fender Zone Bass, Fender Dimension Bass, Fender Bass V, Fender Bronco Bass, or Fender Bullet Bass.

Figure 2C:
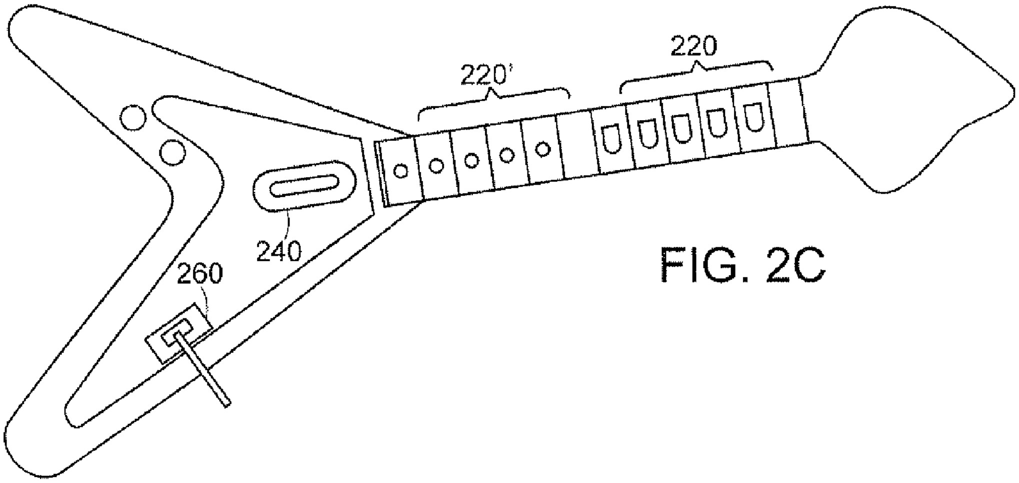
FIG. 2C is a configuration diagram of yet another embodiment of a guitar controller having two sets of fret buttons disposed on the neck of the guitar.

FIG. 2C depicts another alternate embodiment of the guitar controller having two sets of fret buttons 220, 220'. As shown in FIG. 2C a second set of fret buttons 220' is disposed on the "neck" of the guitar proximal to the guitar body, i.e. in between the first set of fret buttons 220 and the guitar body. In some embodiments, the ordering of the second set of fret buttons 220' is the same as the first set of fret buttons 220; that is, if the first set of fret buttons 220 are colored, beginning at the "head" of the guitar neck and moving toward the body, green, red, yellow, blue, orange, then the second set of fret buttons 220' have the same coloring as one continues down the neck toward the guitar body. Although shown in FIG. 2C as round buttons, fret buttons 220' may be any shape or size, including the same shape and size of the first set of fret buttons 220.

Moreover, the second set of fret buttons 220' may be positioned on the neck portion of the guitar controller such that respective ones of the first set of fret buttons and corresponding ones of the second set of fret buttons are positioned on the same fret of the neck (i.e. a red fret button of the first set of buttons 220 and a red fret button of the second set of fret buttons 220' are located near each other on the same "fret" of the neck portion of the guitar controller). In specific ones of these embodiments, fret buttons are physically connected to a toggle switch which allows a single physical button to provide two fret buttons, one associated with a first set of fret buttons and one provided with a second set of fret buttons. In further embodiments, respective ones of the first set of fret buttons 220 and corresponding ones of the second set of fret buttons 220' are electrically connected, e.g. wired together, so that activation of either one of the respective fret buttons is identified by the controller as activation of the fret button, regardless of whether the fret button from the first set of fret buttons 220, the fret button from the second set of fret buttons 220', or both, are activated. In still other embodiments, the respective ones of the fret buttons are not wired together, that is, the controller can distinguish between activation of fret buttons in one set versus activation of fret button in another set.

In some of these latter embodiments, the second set of fret buttons 220' may be used for playing "solos" during gameplay. Use of the guitar controller in this manner provides a player with a more realistic gameplay experience, since guitar solos are often played very close to the body of the guitar. In some embodiments, the second set of fret buttons 220; may be the only set of fret buttons on which hammer-ons and pull-offs may be executed, as described below. In other embodiments, the second set of fret buttons 220' may be used to trigger specific guitar effects, such as pick slides, screeches, or feedback. Alternatively, "performing" using the second set of fret buttons may alter game graphics (such as venue animation, venue lighting, crowd animation, brightness, avatar animation, game cue sustain tail, game cue brightness, game cue sustain tail brightness, game cue size, game cue shape, game cue sustain tail pulsation, and game cue sustain tail size), sound quality, or other gameplay characteristics, such as character health, character wealth in the game, the player's score, or in-game "powerups."

Referring back to any one of FIGS. 2, 2A, 2B and 2C, the simulated guitar controller 200 also includes a vibrato bar 260, also known to guitar players as a tremolo bar or "whammy bar." The vibrato bar 260, for convenience, will be referred to throughout the remainder of this document as a "whammy bar" The whammy bar 260, as will be described below, may be used to alter the frequency, pitch, volume, sound quality, distortion, simulated feedback sound, or any other attribute of the current note or chord being played by the player.

Figure 2D:
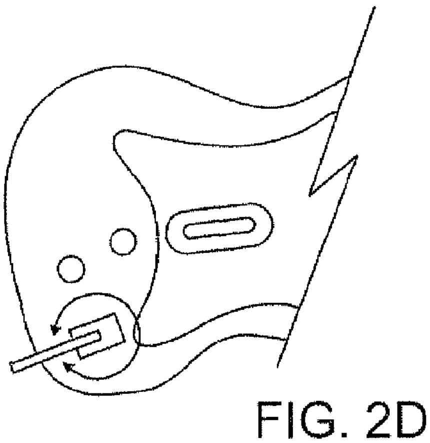
FIG. 2D is a configuration diagram of another embodiment of a guitar controller having a whammy bar in a first position.
Figure 2E:
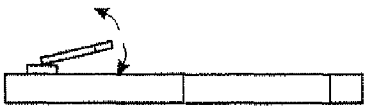
FIG. 2E is a side view diagram of an embodiment of a game controller simulating a guitar that includes a whammy bar.

The whammy bar 260 of the controller resembles a whammy bar of a real guitar. As shown in FIG. 2D, and with comparison to FIG. 2B, the whammy bar 260 can be rotated to any one of a number of positions for the convenience of the player. As shown in FIG. 2D, the whammy bar 260 has been rotated to a position that places it out of the way of the player's strumming hand. In some embodiments, the whammy bar 260 is spring-loaded, like the whammy bar of a real guitar. In these embodiments, as depicted by FIG. 2E, the whammy bar 260 can be pushed down or pulled up to affect the played note. When released, it settles back to its default, neutral position.

The whammy bar is typically manipulated by the guitarist's strumming hand, that is, the hand with which the player operates the strum bar 240. In a real guitar, manipulating the whammy bar directly affects the tension of the guitar strings, and therefore causes the pitch of the vibrating strings to rise and fall as the bar is pulled or pushed. The simulated whammy bar of the guitar controller, the vibrato bar, can be used as a continuous controlling actuator, much like a joystick. Typically, the vibrato bar has a single degree-of-freedom, but it may have more degrees of freedom. It may additionally be used as an on-off switch, instead of a continuous controller. The whammy bar 260 of the controller looks and feels like the whammy bar of a real guitar, and, therefore provides a much more enjoyable gaming experience for the player.

The guitar controller 200 also allows a player to use more sophisticated guitar playing techniques to interact with a game. Two such techniques are "hammer-ons" and "pull-offs." Hammer-ons and pull-offs allow a guitarist to player notes in rapid succession. Typically, they only require the use of the player's fretting hand. To play a hammer-on note, the guitarist uses one of the free fingers of his fretting hand to strike the guitar string with high velocity. This results in the string vibrating due to the force of the string hitting a fret. As a result, the string need not be strummed by the strumming hand. Pull-offs require the guitarist to tug slightly on the string when he releases it from a fret. This pulling action also causes the string to vibrate more, again, eliminating the need to strum the string with the strumming hand.

In the simulated guitar controller 200, hammer-ons may be simulated by allowing the player to press down fret buttons 220 without needing to simultaneously strum the strum bar 240. In one embodiment, this is achieved by the manufacturer of the game identifying a note as amenable to hammering on or pulling off. In other embodiments, notes are identified as amenable to hammering on or pulling off automatically based on timing information between notes. For a hammer-on, a player will generally need to first capture a "lower" pitched note traditionally, that is, by holding down a fret button and simultaneously activating the strum bar. If the next note is identified as amenable to being played by a hammer-on technique, the player need only activate the "higher" pitched fret button to successfully capture the note.

Similarly, in pull-offs, the player can "play a note" by releasing a fret button 220 without needing to simultaneously strum the strum bar 240. This is achieved, again, by the manufacturer of the game identifying a note as a note as amenable to hammering on or pulling off in any of the ways described above. For a pull-off, a player will generally need to first capture a note in the fashion described above, that is, by holding down a fret button and simultaneously activating the strum bar. If the next note is identified as amenable to being played by a pull-off technique, the player need only release a "higher" pitched fret button to successfully capture the note. A player may pull-off or hammer-on multiple notes in succession, if the series of notes to be placed are all identified as amenable to hammering on or pulling off. For example, a note series may contain a 3$^{rd}$ fret note, followed by a 4$^{th}$ fret note, followed by a 3$^{rd}$ fret note, followed by a 4$^{th}$ fret note, etc. The player may capture the first note and then play a series of alternating hammer-ones and pull-offs to capture the remaining notes in the series. In some embodiments, the two notes are not required to be immediately next to one another on the guitar neck. Alternatively, a player may play a series of hammer-ons uninterrupted by a pull-off, for example, by striking buttons associated with successively higher-pitched notes. As discussed above, when using the embodiment of a guitar controller 200 depicted in FIG. 2C, the second set of fret buttons may be used to perform hammer-ons and pull-offs.

In either of these embodiments, notes that may be played using a hammer-on or pull-off technique may be visually indicated to the player. In some embodiments, these notes may be identified by changing their geometric shape or making them appear larger or smaller than normal notes. In other embodiments, these notes may be visually identified by changing the transparency, color, or brightness of the note. In still further embodiments, these notes may be identified by a color pattern on the note, such as a stripe, dot, polka dot, or other visual pattern overlaid on the note. In other embodiments, the a note amenable to being played by a hammer-on or pull-off may be indicated using a different color, for example, instead of orange the gem may have a brown color. In that particular example, it may be said that the second gem appears "dimmer" or "darker" than the first gem.

Figure 2F:
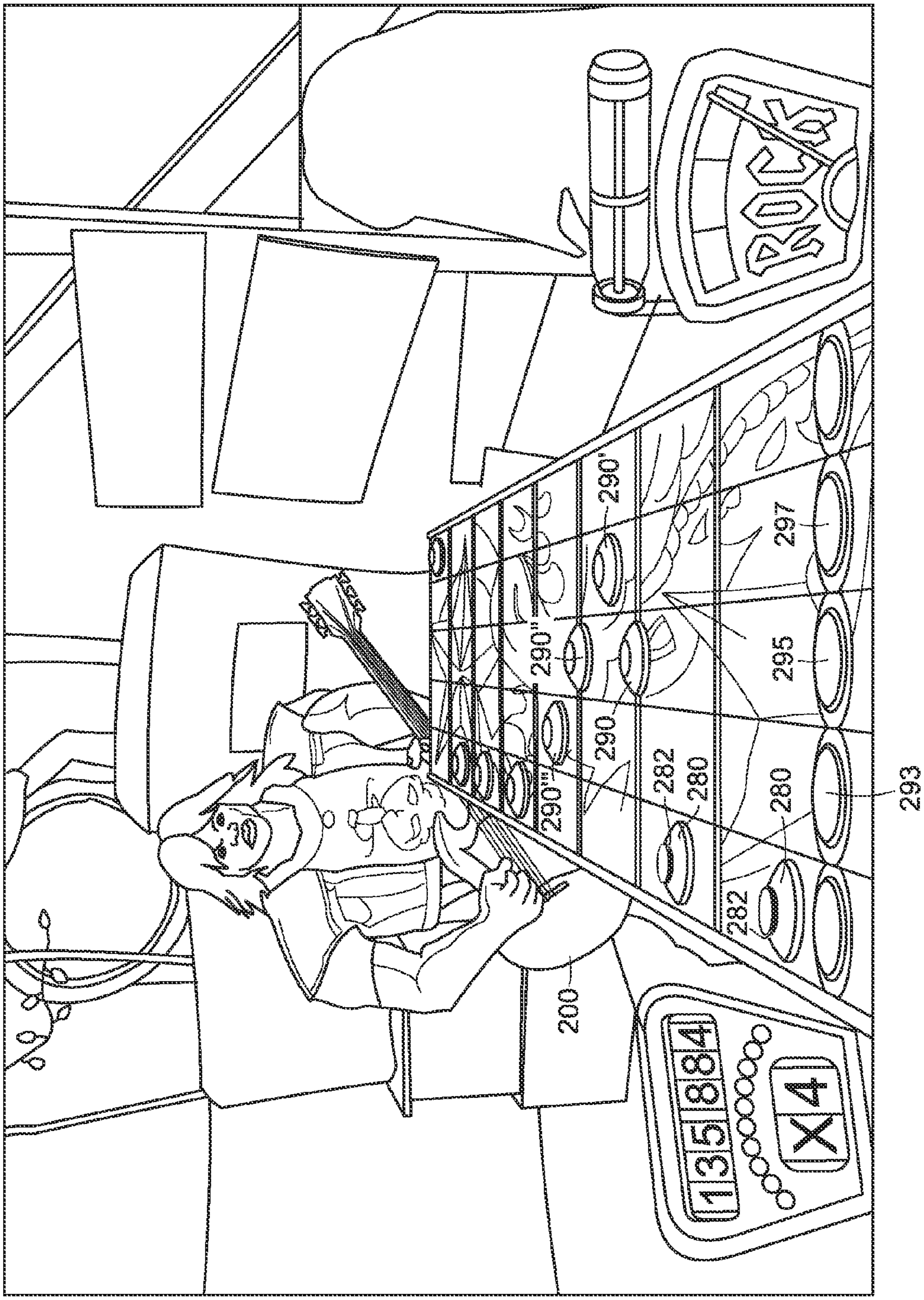
FIG. 2F is a screen shot of an embodiment of a rhythm-action game in which game gems represents notes that may be played by a hammer-on or pull-off technique.

FIG. 2F depicts an embodiment of a rhythm-action game in which notes amenable to performance by a hammer-on or pull-off techniques are indicated visually. As shown in FIG. 2F, notes amenable to performance by pulling-off or hammering-on are indicated by the absence of a ring around the top of the game gem 290. "Normal" notes, that is, notes that are performed by the activation of both a fret button and the strum bar, have a collar 282 surrounding the top of the game gem 280. In the particular embodiment shown in FIG. 2F, the notes 290, 290', 290", 290'" may be performed by the player striking the fret button associated with the target 295 when game gem 290 passes target 295, followed by striking the fret button associated with target 297 when game gem 290' passes the target 297, followed by the release of the fret button associated with target 297 when game gem 290" passes target 295. The note represented by game gem 290''' may be captured either by (1) the player striking the fret button associated with target 293 when the game gem 290''' passes the target 293 or (2) the player releasing the fret button associated with the target 295, provided that the fret button associated with the target 293 is already activated.

Real guitarists often perform flamboyant motions on stage when playing guitar as part of their showmanship. One typical motion involves rotating the guitar vertically so that the neck of the guitar points up, while the body of the guitar is down, usually at waist level. In the simulated guitar controller 200, a mechanical "tilt sensor" can be included that monitors the guitar's physical orientation. This tilt sensor is typically a mercury switch or a ball-bearing switch which acts as a binary actuator, indicating whether the guitar has been rotated into a "neck up" position, or is in the normal playing position. Such tilt sensors have been included in guitar controllers manufactured by Konami and by Red Octane. Other secondary techniques for interacting with the controller include shaking the controller and slapping the controller.

Figure 3:
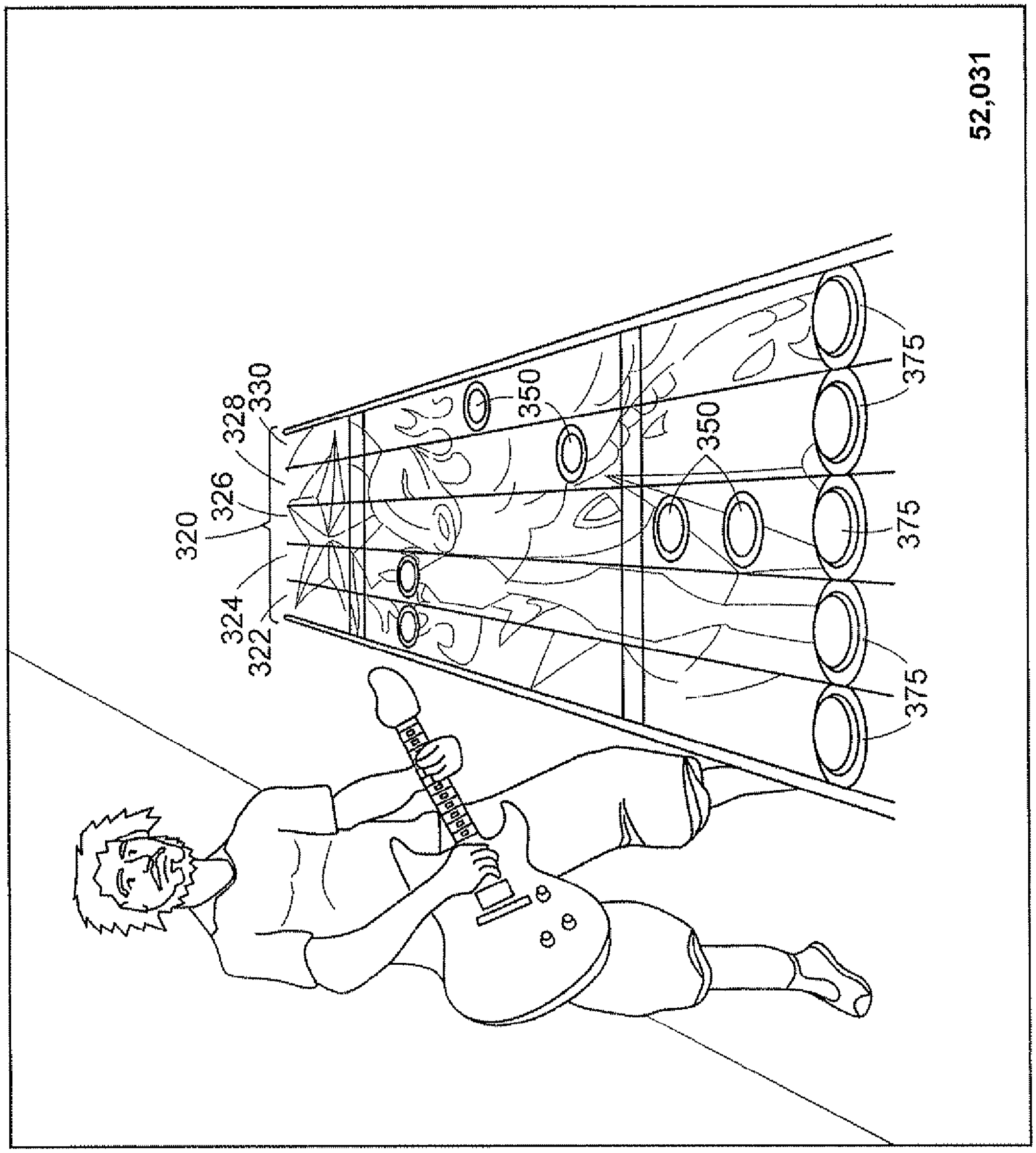
FIG. 3 a screen shot depicting one embodiment of a screen display of a rhythm action game.

Referring now to FIG. 3, one embodiment of a screen shot depicting a rhythm action game in which the simulated musical instrument, such as a simulated guitar controller, can be used is shown. A lane 320 extends to the players. In the embodiment shown in FIG. 3, the lane has five sub lanes 322, 324, 326, 328, 330 which correspond to a respective one of the fret buttons 220 provided on the guitar controller 200. In other embodiments, the number of sublanes does not need to match the number of fret buttons 220 provided by the simulated guitar controller 200. For embodiments in which there are more fret buttons 220 provided than sublanes, a subset of the provided fret buttons 220 may be used to interact with the game. For those embodiments in which there are more sublanes than fret buttons 220, one fret button 220 may be assigned to more than one sublane.

As shown in FIG. 3, each lane may be subdivided into a plurality of segments. Each segment may correspond to some unit of musical time, such as a beat, a plurality of beats, a measure, or a plurality of measures. Although the embodiment shown in FIG. 3 show equally-sized segments, each segment may have a different length depending on the particular musical data to be displayed. In addition to musical data, each segment may be textured or colored to enhance the interactivity of the display.

Referring back to FIG. 3, a sublane may have one or more game "cues", "elements" or "gems" 350 corresponding to musical events distributed along the sublanes. During gameplay, the cues 350 appear to flow toward a game player. The cues 350 are distributed on the sublanes in a manner having some relationship to musical content associated with the game level. For example, the cues may represent note information (gems spaced more closely together for shorter notes and further apart for longer notes, pitch (gems placed on the left side of the lane for notes having lower pitch and the right side of the lane for higher pitch), volume (gems may glow more brightly for louder tones), duration (gems may be "stretched" to represent that a note or tone is sustained), articulation, timbre or any other time-varying aspects of the musical content. Although shown in FIG. 3 as a circular element, the game elements 350 may be any geometric shape, and may have other visual characteristics, such as transparency, color, or variable brightness.

As the game elements 350 move along a respective sublane, musical data represented by the game elements 350 may be substantially simultaneously played as audible music when the player successfully performs the event. To successfully perform an event, a player holds down the fret button 220 corresponding to the sublane on which the game element 350 appears while strumming the strum bar 240. The player must perform this action when the game element 350 passes under the target marker 375. In some embodiments, the player may hold down the corresponding fret button at any point in time before the moment when game element 350 passed under the target marker 375. In other embodiments, the player may successfully perform an event by performing a hammer-on or pull-off when the game element 350 passes under the target marker 375.

In some embodiments, audible music represented by a game element 350 is only played (or only played at full or original fidelity) if a player successfully "performs the musical content" by capturing or properly executing the game element 350. In other embodiments, the audible music represented by a game element 350 is modified, distorted, or otherwise manipulated in response to the player's proficiency in executing game elements associated with a sublane. For example, various digital filters can operate on the audible music prior to being played by the game player. Various parameters of the filters can be dynamically and automatically modified in response the player capturing game elements associated with sublane, allowing the audible music to be degraded if the player performs poorly or enhancing the audible music if the player performs well. For example, if a player fails to execute a game event, the audible music represented by the failed event may be muted, played at less than full volume, or filtered to alter the its sound. In certain embodiments, a "wrong note" sound may be substituted for the music represented by the failed event. Conversely, if a player successfully executes a game event, the audible music may be played normally. In some embodiments, if the player successfully executes several, successive game events, the audible music associated with those events may be enhanced, for example, by adding an echo or "reverb" to the audible music. The filters can be implemented as analog or digital filters in hardware, software, or any combination thereof. Further, application of the filter to the audible music output, which in many embodiments corresponds to musical events represented by game elements 350, can be done dynamically, that is, during play. Alternatively, the musical content may be processed before game play begins. In these embodiments, one or more files representing modified audible output may be created and musical events to output may be selected from an appropriate file responsive to the player's performance.

Figure 3A:
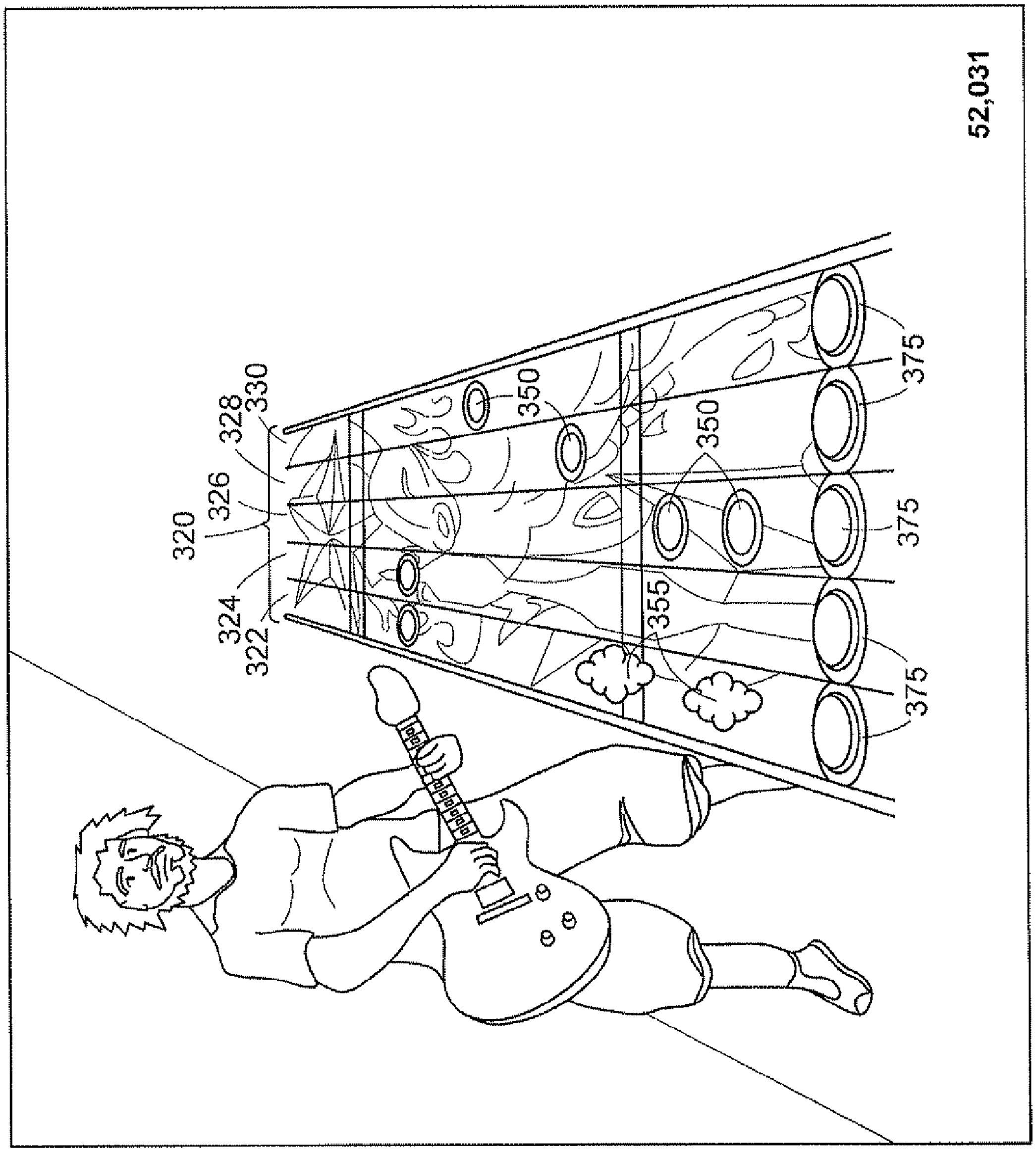
FIG. 3A a screen shot depicting one embodiment of a screen display of a rhythm action game.

FIG. 3A depicts a screenshot of an embodiment of a rhythm-action game in which a second set of fret buttons is part of gameplay. As shown in FIG. 3A and similar to FIG. 3, cues 350 appear to flow toward a game player. Unlike the embodiment depicted in FIG. 3, a second set of cues 355 are also distributed on the sublanes. The second set of game cues 355 indicate to the player that the second set of fret buttons 220' should be used when performing those game events. In some embodiments, failure to perform those game events on the second set of fret buttons 220' may result in failure. In other embodiments, successfully performing the game events indicated by the second set of game cues 355 may alter game graphics (such as venue animation, venue lighting, crowd animation, brightness, avatar animation, game cue sustain tail, game cue brightness, game cue sustain tail brightness, game cue size, game cue shape, game cue sustain tail pulsation, and game cue sustain tail size), sound quality, or other gameplay characteristics, such as character health, character wealth in the game, the player's score, or in-game "powerups." Although the difference between game cues 350 and 355 is shown in FIG. 3 as geometric shape, the difference may be indicated using any visual characteristics, such as transparency, color, or brightness.

Figure 4:
FIG. 4 is a screen shot depicting one embodiment of a screen display in which a player affects gameplay using a guitar controller having a whammy bar.

Referring now to FIG. 4, one embodiment of a screen display showing player interaction using the whammy bar is shown. As described above, successfully activating the correct fret button 220 and strum bar 240 results in performance of a musical event. By activating the whammy bar, the player can alter the certain aspects of the reproduced musical event. For example, pushing or pulling on the whammy bar can change the pitch of a note or chord, the volume of a note or chord, or the sound quality of a note or chord. Activation of the whammy bar may also add effects to the audio such as simulated feedback, flange, fuzz, vocoder, echo, reverb, chorus, and delay. In some embodiments, pushing or pulling the whammy bar can add a feedback audio effect to a note or chord. In other embodiments, pushing or pulling the whammy bar can add a distortion audio effect to the note or chord being held. In addition, the whammy bar can affect sustained notes in addition to short single gems.

As shown in FIG. 4, pushing or pulling the whammy bar 260 may affect the graphical elements of the game. In FIG. 4, use of the whammy bar alters a note's "sustain trail," a visual cue that helps a player know for how long a fret button should be depressed. As shown in FIG. 4, the player is using the whammy bar to alternately increase and decrease the width of the sustain trail. Others visuals can be directly affected by the whammy bar. The graphical display of the note may widen or narrow, it may brighten or dim, pulses can be animated down the length of the note, and its overall size may grow or shrink. Any number of graphical effects may alter the note to inform the player that the whammy bar is being actively used. In some embodiments, the player might be required by the game to move the whammy bar synchronously with a pitch bend in the recorded music. The player's moving of the whammy bar does not affect the sound, but the player's ability to bend the whammy bar as directed by the game affects the player's game score.

In other embodiments, use of the whammy bar may alter both the visual and auditory aspects of the game. For example, referring to FIG. 4, use of the whammy bar may cause the pitch of the sustained note to increase and decrease while the displayed sustain trail is widened and narrowed. In another embodiment, use of the whammy bar distorts a sustained note and causes a player's avatar to execute a flamboyant move, such as a jump, striking a pose with the guitar, or "machine gunning" the crowd with the guitar.

Figure 5:
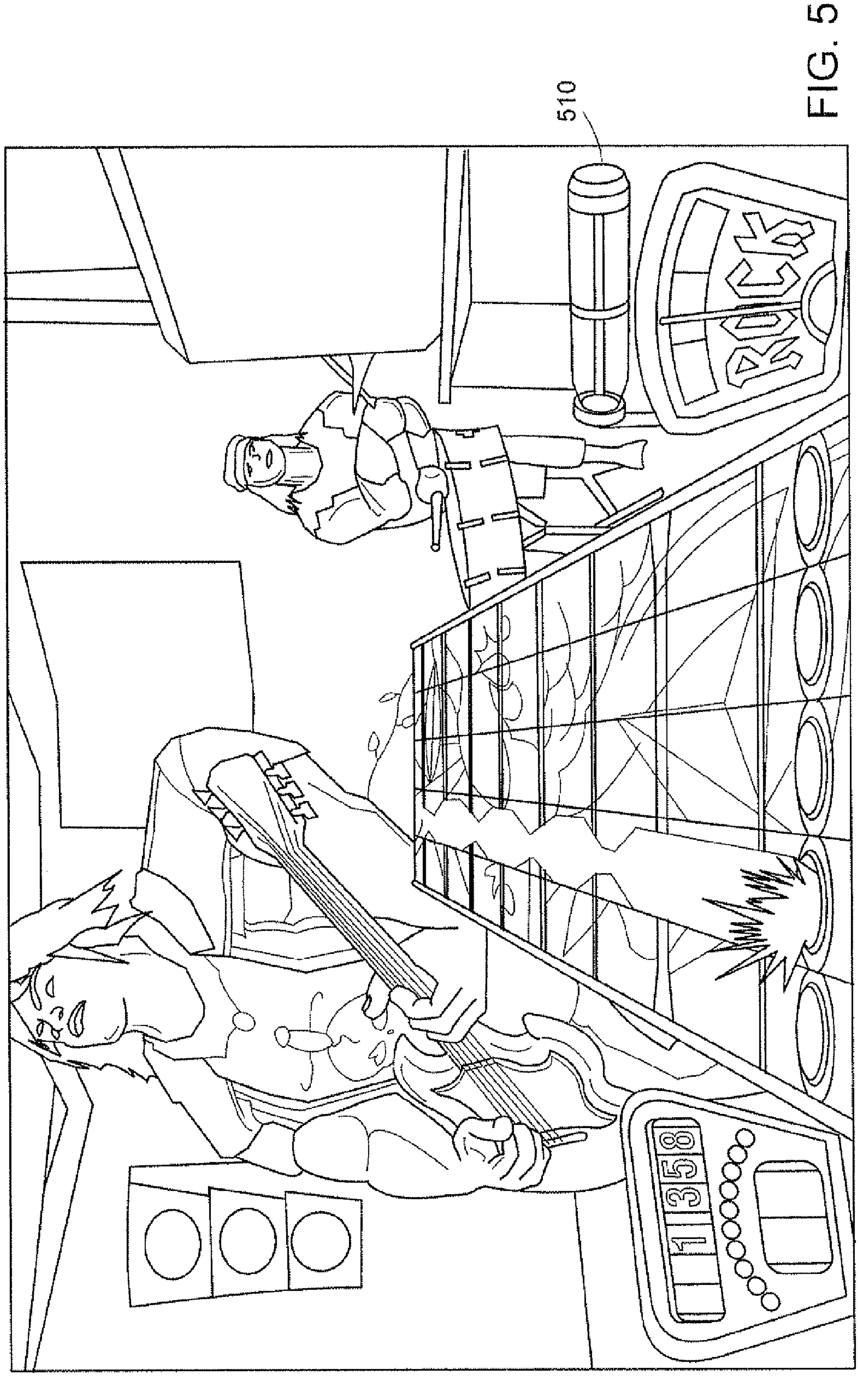
FIG. 5 is a screen shot depicting another embodiment of a screen display in which a player affects gameplay using a guitar controller having a whammy bar.

FIG. 5 depicts an embodiment of a screen display showing how use of the whammy bar may be used as a gameplay mechanic. In the screenshot shown if FIG. 5, the player is using the whammy bar to alter the pitch of a performed note. As shown in FIG. 5, the altered note is a special note indicating that the player will receive a bonus for successfully performing the note. By altering the note's pitch using the whammy bar, the player builds up the bonus more quickly. In one specific embodiment, the bonus is referred to as "star power collection" and is graphically indicated by the "star meter" 510.

In other embodiments, manipulating the whammy bar can affect other aspects of gameplay, such as the excitement of the simulated crowd, the number of points the player receives, the amount of "health" a player has, or, in general, the amount of any arbitrary game resource, such as points, score, health, money.

In some embodiments, the controller 200 may be used in conjunction with effects pedals that allow a player to activate certain audio effects. For example, a controller 200 may be provided with a socket for receiving input indicating activation of a flange pedal, fuzzbox, vocoder, distortion pedal, echo pedal, reverb pedal, chorus pedal, delay pedal, pedals that affect the attack and decay of a reproduced note and any other pedal typically used with real guitars.

The tilt sensor of controller 200 may be used as part of a gameplay mechanic. In one specific embodiment, tilting the guitar vertically causes "star power deployment" and is indicated by scoring, graphical, and sonic changes in the game. For example, tilting the guitar vertically changes the excitement of the simulated crowd, the number of points a player receives, the rate at which a player accumulates points, the overall reverberation of the music, the sound quality of the guitar notes, and other graphical and audio effects.

Although described in the context of a rhythm action game, the simulated guitar controller 200 may be used with any genre of game, including first-person shooter, survival horror, action adventure, fighting games, role playing games, real-time strategy games, platformers, puzzle games, racing games, sports games, and stealth action games, third-person shooters. The simulated guitar controller 200 may also be used with rhythm action games that do not center on performance of a musical work using an instrument, such as Dance Dance Revolution of Karaoke Revolution, both published by Konami.

Having described certain embodiments of the invention, it will now become apparent to one of skill in the art that other embodiments incorporating the concepts of the invention may be used. Although the described embodiments relate to the field of rhythm-action games, the principles of the invention can extend to other areas that involve musical collaboration or competition by two or more users connected to a network. Therefore, the invention should not be limited to certain embodiments, but rather should be limited only by the spirit and scope of the following claims.

What is claimed is:

1. A method for providing realistic interaction by a player with a music-based video game using a game controller simulating a guitar and having a strum bar and a plurality of fret buttons, the method comprising:

a) displaying to a player first target musical data associated with a musical composition;

b) receiving first music performance input from the player comprising activation of a first one of a plurality of fret buttons and a strum bar;

c) displaying to a player second target musical data associated with the musical composition, the second target musical data visually indicating to a player that the musical event represented by the second target musical data is amenable to a hammer-on technique;

d) receiving second music performance input from the player consisting essentially of activation of a second one of a plurality of fret buttons.

2. The method of claim 1 wherein step (a) comprises displaying to a player first target musical data associated with a musical composition, the first target musical data disposed along a musical time axis that does not lie in the image plane of a display associated with the player.

3. The method of claim 1 wherein step (c) comprises displaying to a player second target musical data associated with a musical composition, the second target musical data disposed along a musical time axis that does not lie in the image plane of a display associated with the player.

4. The method of claim 1 wherein step (c) comprises displaying to a player second target musical data associated with a musical composition, the second target musical data having a visual appearance different from that of the first target musical data.

5. The method of claim 4 wherein step (c) comprises displaying to a player second target musical data comprising a shape different from that of the first target musical data.

6. The method of claim 4 wherein step (c) comprises displaying to a player second target musical data with a color different from that of the first target musical data.

7. The method of claim 1 further comprising the step of reproducing a portion of the musical composition in response to the received second music performance input.

8. The method of claim 7 further comprising the step of altering a characteristic of the music-based video game in response to the received second music performance input.

9. The method of claim 8 wherein the step of altering comprises altering a gameplay characteristic of the music-based video game in response to the second musical performance input.

10. The method of claim 9 wherein the altered gameplay characteristic is selected from the group consisting of score bonus, star power, player score, character health, character money, in-game power-ups, and crowd excitement.

11. The method of claim 1 further comprising the step of displaying to a player third target musical data associated with the musical composition.

12. The method of claim 11 further comprising the step of receiving third music performance input from the player consisting essentially of activation of one of the plurality of fret buttons.

13. The method of claim 11 further comprising the step of receiving third music performance input from the player consisting essentially of activation of the first one of the plurality of fret buttons.

14. The method of claim 11 further comprising the step of receiving third music performance input from the player consisting essentially of deactivation of one of the plurality of fret buttons.

15. A method for providing realistic interaction by a player with a music-based video game using a game controller simulating a guitar and having a strum bar and a plurality of fret buttons, the method comprising:

a) displaying to a player first target musical data associated with a musical composition, b) receiving first music performance input from the player comprising activation of a plurality of fret buttons and activation of a strum bar;

c) displaying to a player second target musical data associated with the musical composition, the second target musical data visually indicating to a player that the musical event represented by the second target musical data is amenable to a pull-off technique;

d) receiving second music performance input from the player consisting essentially of deactivation of one of a plurality of fret buttons.

16. The method of claim 15 wherein step (a) comprises displaying to a player first target musical data associated with a musical composition, the first target musical data disposed along a musical time axis that does not lie in the image plane of a display associated with the player.

17. The method of claim 15 wherein step (c) comprises displaying to a player second target musical data associated with a musical composition, the second target musical data disposed along a musical, time axis that does not lie in the image plane of a display associated with the player.

18. The method of claim 15 wherein step (c) comprises displaying to a player second target musical data associated with a musical composition, the second target musical data having a visual appearance different from that of the first target musical data.

19. The method of claim 18 wherein step (c) comprises displaying to a player second target musical data comprising a shape different from that of the first target musical data.

20. The method of claim 18 wherein step (c) comprises displaying to a player second target musical data with color different from that of the first target musical data.

21. The method of claim 15 further comprising the step of reproducing a portion of the musical composition in response to the received second music performance input.

22. The method of claim 21 further comprising the step of altering a characteristic of the music-based video game in response to the received second music performance input 23. The method of claim 22 wherein the step of altering comprises altering a gameplay characteristic of the music-based video game in responses to the second musical performance input.

24. The method of claim 23 wherein the altered gameplay characteristic is selected from the group consisting of score bonus, star power, player score character health, character money, in-game power-ups, and crowd excitement.

25. The method of claim 15 further comprising the step of displaying to a player third target musical data associated with the musical composition.

26. The method of claim 25 further comprising the step of receiving third music performance input from the player consisting essentially of deactivation of another of the plurality of fret buttons.

27. The method of claim 25 further comprising the step of receiving third music performance input from the player consisting essentially of activation of a fret button.

* * * * *

UNITED STATES PATENT AND TRADEMARK OFFICE

CERTIFICATE OF CORRECTION

PATENT NO. : 7,459,624 B2
APPLICATION NO. : 11/683136
DATED : December 2, 2008
INVENTOR(S) : Schmidt et al.

It is certified that error appears in the above-identified patent and that said Letters Patent is hereby corrected as shown below:

In claim 17, column 12, line 14, delete "," after the word musical.

In claim 23, column 12, line 35, delete "responses" and replace it with --response--.

In claim 24, column 12, line 39, insert --,-- after the phrase player score.

Signed and Sealed this

Third Day of March, 2009

JOHN DOLL
*Acting Director of the United States Patent and Trademark Office*